Aug. 10, 1965   L. C. CHOUINGS   3,199,928
LOAD RESPONSIVE VALVE
Filed March 9, 1962   6 Sheets-Sheet 2

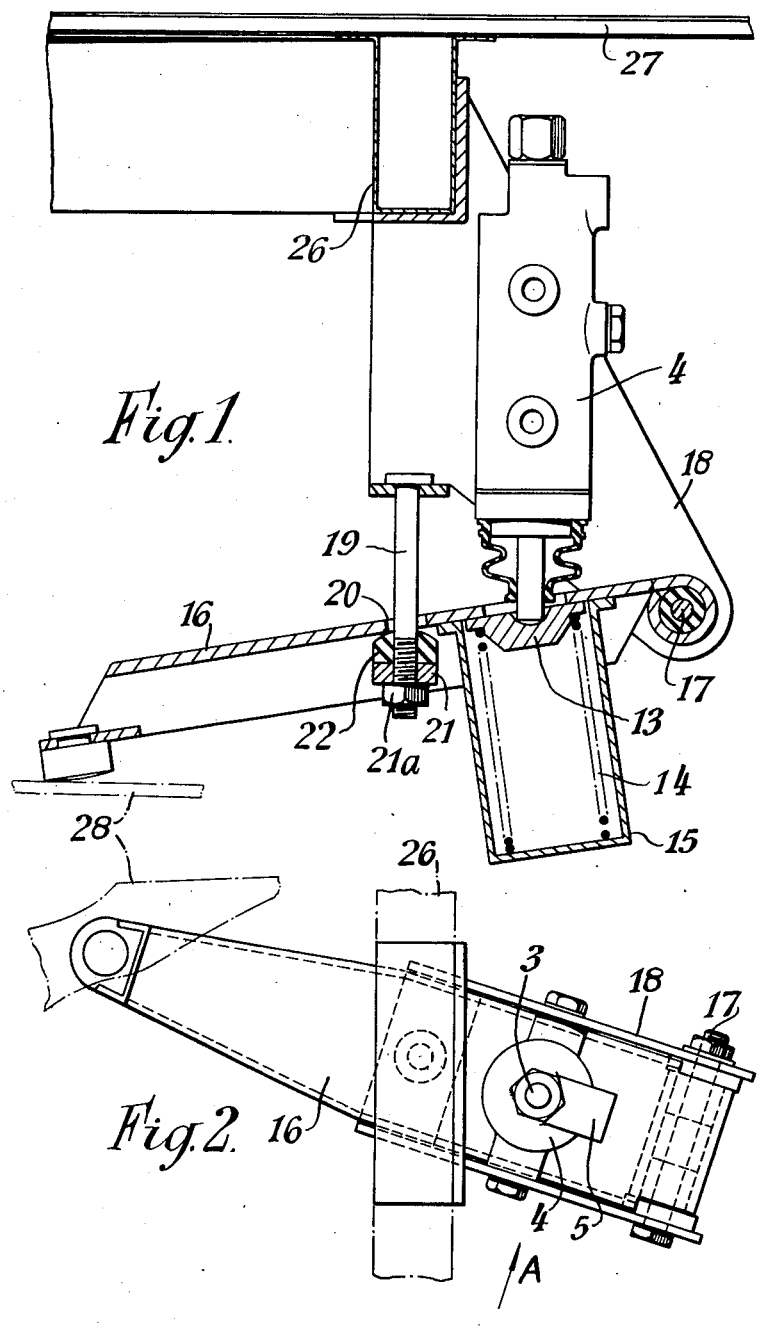

INVENTOR
Leslie C. Chouings
BY
Lawrence J. Winter
ATTORNEY

Aug. 10, 1965  L. C. CHOUINGS  3,199,928
LOAD RESPONSIVE VALVE
Filed March 9, 1962  6 Sheets-Sheet 3

INVENTOR
Leslie C. Chouings
BY Lawrence J. Winter
ATTORNEY

Aug. 10, 1965 L. C. CHOUINGS 3,199,928
LOAD RESPONSIVE VALVE
Filed March 9, 1962 6 Sheets-Sheet 5

INVENTOR
BY
ATTORNEY

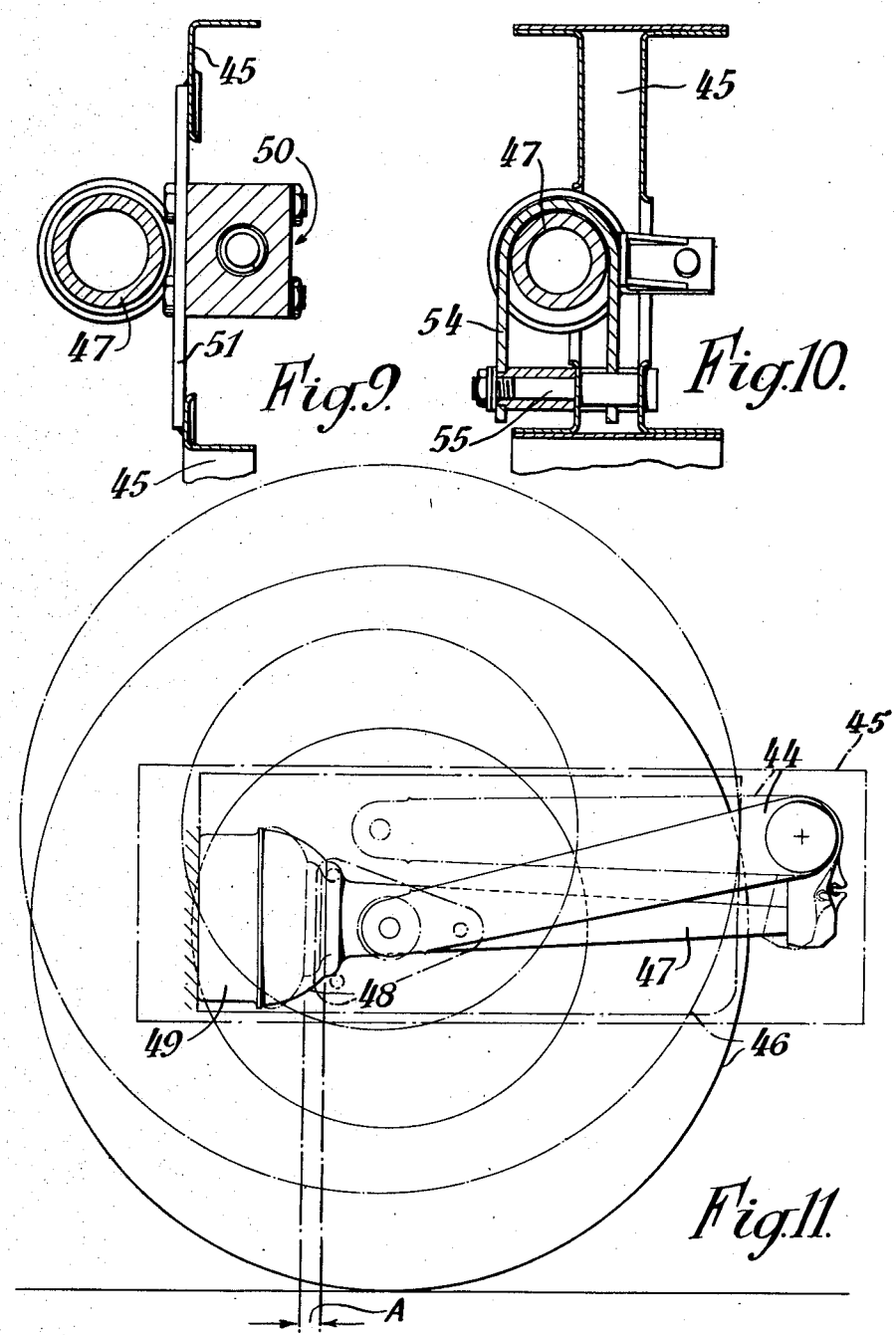

United States Patent Office 3,199,928
Patented Aug. 10, 1965

3,199,928
LOAD RESPONSIVE VALVE
Leslie C. Chouings, Leamington Spa, England, assignor to Automotive Products Company Limited, Leamington Spa, England
Filed Mar. 9, 1962, Ser. No. 178,702
Claims priority, application Great Britain, Mar. 9, 1961, 8,677/61
8 Claims. (Cl. 303—22)

This invention relates to valves for liquid pressure braking systems for vehicles.

In order to regulate the pressure acting on the rear wheel brakes of a vehicle with respect to that operating in the front wheels it has already been proposed to incorporate a valve in the brake system which is operable to control the supply of pressure liquid from the source of supply to the wheel cylinders of the rear wheel brakes by the pressure derived from said source when the said pressure reaches a predetermined value, so that the further increase of pressure in the wheel cylinders associated with the rear wheel brakes as the pressure derived from the pressure source continues to increase is prevented or reduced to a proportion thereof.

The invention has for its object to enable a valve of this kind, suitably modified, to be used in the braking system of a vehicle subject to considerable variations in loading for example a van, truck or other load carrying vehicle and wherein the braking effort required can vary considerably with the varying load. To this end the invention provides a valve having a spring loaded movable valve member movable from a normally open position to which it is urged by the spring action, to a closed position by pressure created in the system in which the valve is connected and means for varying automatically the spring loading of the movable valve member upon variation of the loading of the vehicle on which the valve is fitted. The means for varying the spring loading of the movable valve member comprises for example a sensing device associated with the valve so as to be operable by relative movement between the part of the vehicle structure to which the valve is attached and an adjacent part of the vehicle structure between which parts relative movement occurs with variation of vehicle loading.

Preferably means are provided for damping any tendency for the sensing device to cause oscillation of the movable valve member which could be caused by the vehicle travelling over uneven ground.

A valve according to the invention comprises for example a valve body having inlet and outlet openings for pressure fluid a spring loaded movable valve member controlling the passage of fluid between said inlet and outlet openings and adapted to be urged to the closed position against the spring action by pressure fluid entering the valve inlet, adjusting means for varying the loading of the spring and sensing means operable by relative movement between fixed and movable parts of the vehicle structure which movement results from vehicle loading, to cause operation of the adjusting means with variation of the spring loading of the movable valve member.

Embodiments of the invention will now be described by way of example by aid of the accompanying drawings in which:

FIGURE 1 is a view taken in the direction of arrow "A" in FIGURE 2 showing a valve according to one embodiment of the invention installed between the platform and rear axle of for example a truck;

FIGURE 2 is a plan view of the valve of FIGURE 1;

FIGURES 9 and 10 are sections on the lines IX—IX and X—X of FIGURE 7 respectively;

FIGURE 11 is a diagrammatic view of the wheel and suspension of FIGURE 7 and showing positions of the suspensions in the unladen and laden conditions of the vehicle.

Figure 3:
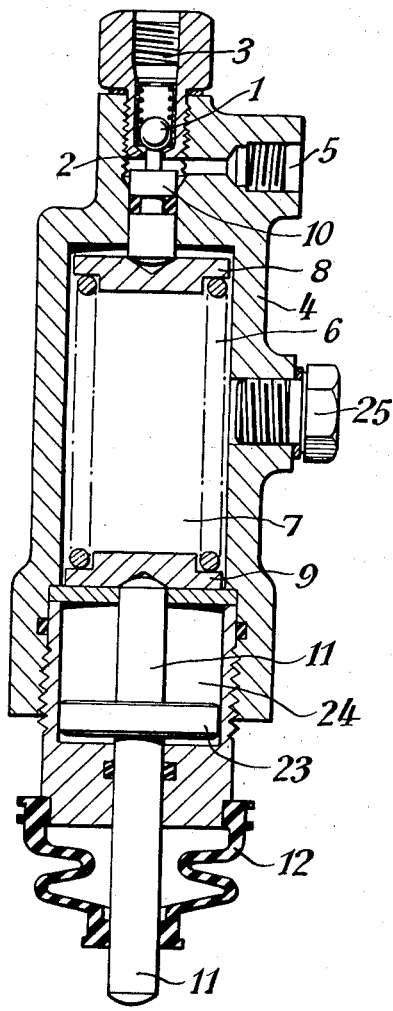
FIGURE 3 is a longitudinal section of the valve.
Figure 4:
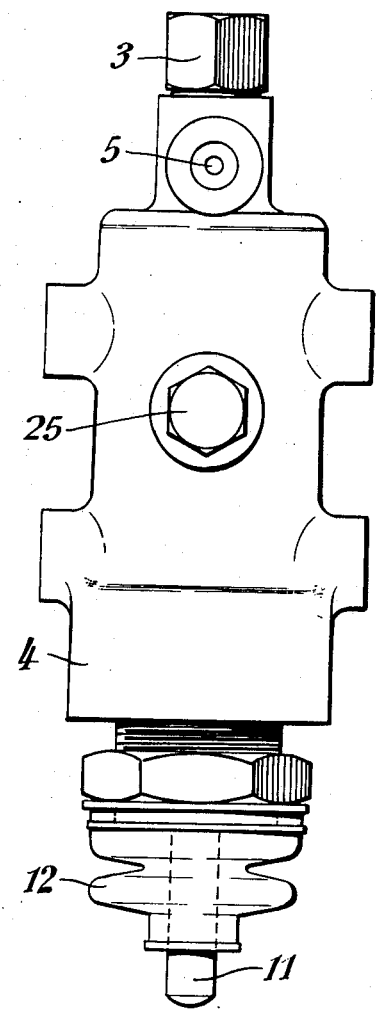
FIGURE 4 is a view of the valve as seen from the right of FIGURE 3.

Referring to FIGURES 1 to 4 of the accompanying drawings the valve has a ball 1 as the movable valve member which co-operates with a valve seating 2 to control the flow of pressure fluid between an inlet 3 in the valve body 4 which is connectable to the pedal operated master cylinder of the braking system of the vehicle and an outlet 5 connectable to the wheel cylinder or cylinders of the rear wheels of the vehicle. The valve seating 2 and inlet 3 for pressure fluid are arranged so that pressure from the pressure source urges the ball onto its seating the ball being spring loaded so as normally to be urged away from its seating. The spring 6 acting on the ball is disposed on the side of the valve seat remote from the inlet 3 and is contained in a housing 7 provided in the valve body. The spring 6 is located between spring end plates 8 and 9 the spring loading being transmitted to the ball to apply an unseating thrust thereto by a plunger 10 which extends through the valve seating with sufficient clearance to permit the flow of pressure fluid. One end of the plunger contacts the ball and the other end is in contact with the spring end plate 8, the ball being seated when the pressure in the pressure source reaches a value sufficient to overcome the action of the spring 6. The spring end plate 9 at the end of the spring 6 remote from the ball contacting plunger 10 is in contact with the inner end of a rod 11 which projects outwardly from the spring housing a suitable flexible type boot 12 being provided around the rod to prevent the ingress of dirt and moisture.

A piston 23 is carried by the rod 11 and disposed intermediate the length thereof the piston 23 being located in a hydraulic cylinder 24 forming an extension to the spring housing 7 in which the spring 6 acting on the ball valve plunger 10 is located. A filler plug 25 for hydraulic fluid is provided in the valve body 4.

The valve is combined with a sensing device as follows. The outer end of the rod 11 is hemi-spherical and is located in a correspondingly shaped recess in a pressure plate 13 located at one end of a compression spring 14 contained within a casing 15 carried by an arm 16 which is pivotally mounted about one end on a pivot pin 17 carried between the bifurcated end of a bracket 18 secured to the valve body 4. The pivot pin 17 extends at right angles to the axis of the rod 11 and is offset to one side thereof so that pivotal movement of the arm 16 in one direction referred to as inward movement, causes the rod 11 to move inwardly to compress the spring acting on the plunger 10 in contact with the ball valve 1 thus increasing the spring loading, pivotal movement of the arm in the opposite direction referred to as outward pivotal movement, permitting the said spring 6 to expand to reduce the spring loading on the ball valve 1. The outward pivotal movement of the arm 16 is limited by stop means consisting of a bolt 19 supported by the bracket 18, the shank of the bolt passing through a clearance hole 20 in the arm 16. The threaded end of the bolt has a nut 21 supporting a bush 22 against the opposite face of the arm 16. By rotation of the nut 21 the rest or angular position of the arm 16 can be adjusted with a lock nut 21a securing the nut 21 in the adjusted position. The characteristics of the compression spring 14 are such that displacement of the arm can take place relative to the member 13, when the vehicle is travelling over uneven ground so that further operation of the valve by the sensing means is avoided under such conditions.

In use as shown in FIGURES 1 and 2, the valve is mounted on a cross channel member 26 supporting the platform 27 of the vehicle the free end of the arm 16 being in contact with a bracket plate 28 secured to the rear axle of the vehicle. Thus as the load in the vehicle is increased and the platform or floor moves downwardly relative to the axle under the load, the arm 16 pivots inwardly with the result that the spring loading acting on the ball is increased, reverse movement of the arm occurring when the vehicle load is reduced. The piston 23 and cylinder 24 provide a dashpot device which absorbs shocks and prevents hunting from the actuating means.

Figure 5:
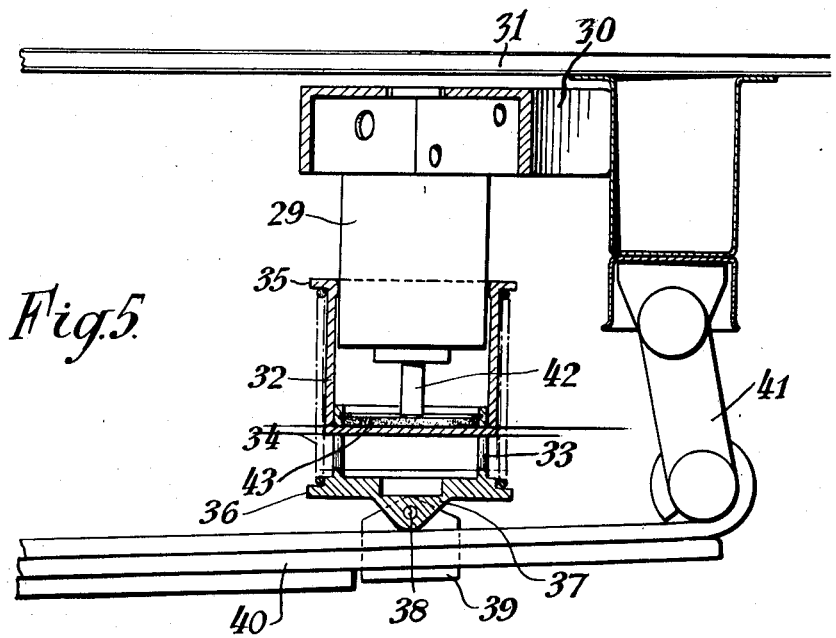
FIGURE 5 is a view partly in section of a valve according to a further embodiment of the invention, the valve being installed between a road spring of the vehicle for example a truck, and the platform thereof.
Figure 6:
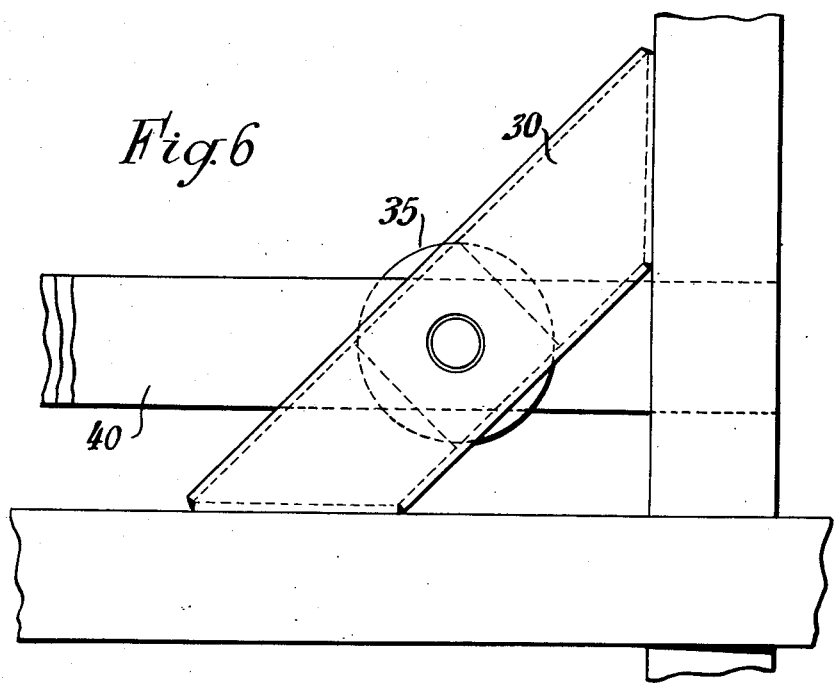
FIGURE 6 is a plan view of the installation of FIGURE 5 the platform being removed.
Figure 7:
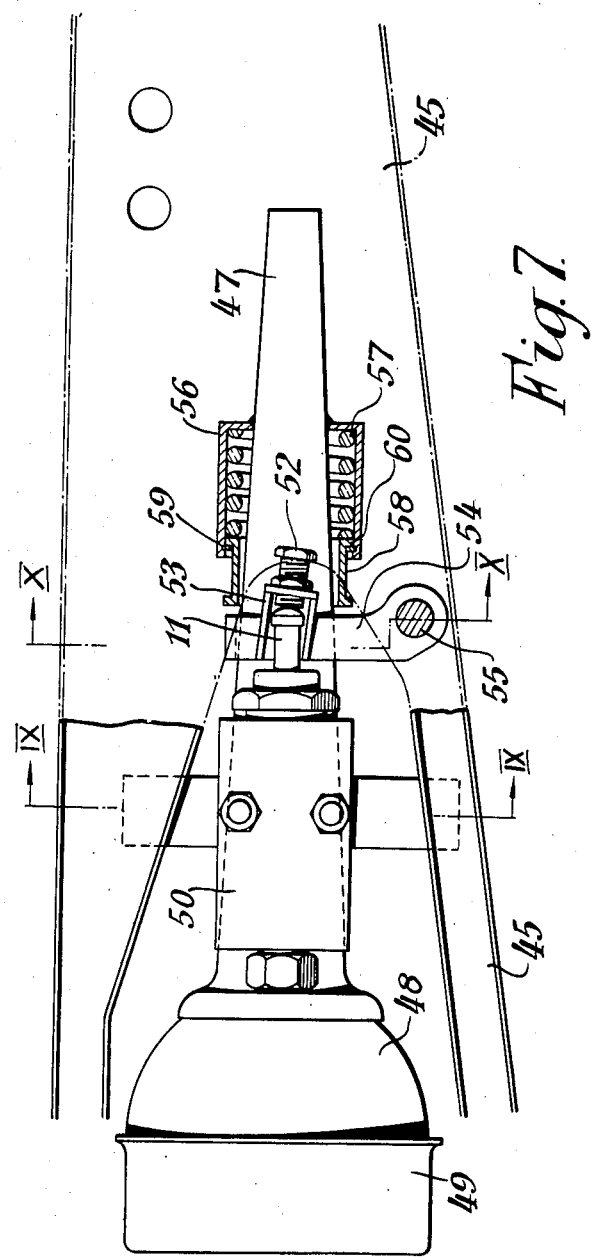
FIGURE 7 shows a valve of the kind shown in FIGURES 3 and 4 installed in the independent suspension of a road vehicle such as a "mini" type vehicle.
Figure 8:
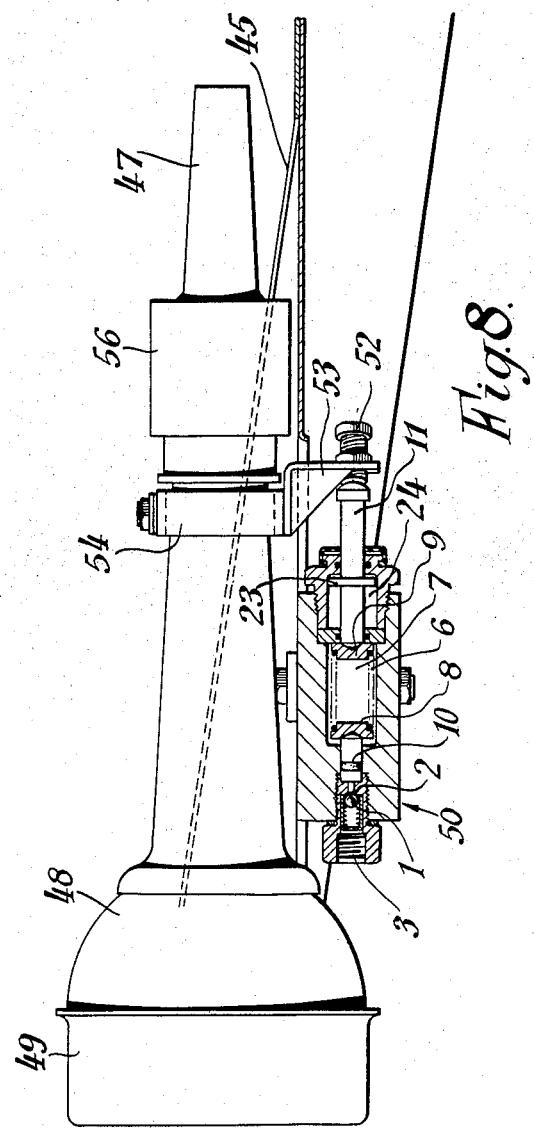
FIGURE 8 is a plan view of FIGURE 7 showing the valve in section.

In the arrangement according to FIGURES 5 and 6, the valve is installed so as to be operable by a suspension spring of the vehicle. In this arrangement the valve with the damping means and shown generally at 29 is carried by an angle member 30 of the vehicle frame supporting the vehicle platform 31, the valve being arranged to extend downwardly in relation to the platform. The lower end of the valve extends into a cup-shaped member the bottom of which 32 is slotted to receive legs formed by a cut-away cylinder 33. The member 32 and cylinder 33 are urged apart by a compression spring 34 which extends between external flanges 35, 36 on the member 32 and cylinder 33 respectively. The closed end of the cylinder has a lug 37 which is coupled by a pivot pin 38 to a bracket 39 mounted on the leaf spring 40 of the vehicle the spring shackle at one end thereof being shown generally at 41. The valve 29 has an operating rod 42 extending outwardly therefrom the outer end of the rod being in contact with a "nylon" pad 43 resting on the bottom of the cup-shaped member 32. Deflections of the spring 40 are thus applied to the push rod 42 through the spring 34.

In the arrangement shown in FIGURES 7 to 11 of the accompanying drawings a valve of the kind disclosed generally in connection with FIGURES 1 to 4 is installed in the rear suspension of the kind now used in the smaller class of road vehicles commonly referred to as "mini-vehicles."

In the suspension shown diagrammatically in the drawings, drag arms 44 pivotally attached at one end to the vehicle chassis, indicated by the reference numeral 45, connect the stub axle of the road wheel 46 to the chassis the wheel displacement being controlled by a compression tube 47 one end of which carries a flexible buffer 48 of for example synthetic rubber which is supported in a metal cup 49 welded to a cross member of the vehicle chassis.

The valve indicated generally by the reference numeral 50 is mounted on a bracket 51 carried by the vehicle chassis and is arranged to extend alongside the compression tube in the fore and aft direction of the vehicle. The valve is substantially identical in construction to the valve disclosed in connection with FIGURES 1 to 4 and accordingly the same reference numerals are used to denote corresponding parts. The outer end of the operating rod 11 of the valve is in contact with an adjustable tappet screw 52 carried by a tappet mounting 53 on a swinging stirrup 54 pivotally mounted about one end on a pivotal mounting 55 supported by the chassis member 45. The compression tube passes through the stirrup 54 and serves to limit the movement of the compression tube in the upward direction.

A cylinder 56 closed at one end and disposed around the compression tube to which it is welded, forms a housing for a compression spring 57 one end of which bears against the closed end of the cylinder, the opposite end bearing against a sleeve 58 slidable in the housing. The outward movement of the sleeve is limited by a spring retaining ring 59 which is engageable by an external flange 60 on the sleeve 58. The outer end of the sleeve 58 faces the adjacent edge of the stirrup 54 a clearance being provided between the said edge and face under static conditions of the suspension.

FIGURE 11 of the drawings shows the suspension in the unladen and a laden condition of the vehicle, the former being represented by the full lines and the latter by the chain dot lines. As shown by the chain dot lines in the laden condition of the vehicle, the flexible buffer 48 is deformed due to the axial displacement of the compresssion tube resulting from angular movement of the drag arms 44. The amount of axial displacement is represented by the dimension "A." As a result of this axial displacement the sleeve 58 is brought into engagement with the stirrup 54 so that the same is turned about its pivotal mounting to cause the tappet screw 52 to operate the valve. The characteristics of the compression spring 57 are such that a telescopic action of the sleeve 58 can occur when the vehicle is travelling over uneven ground so that further movement of the stirrup is avoided under such conditions.

I claim:

1. A valve for a fluid pressure braking system of a vehicle with a spring loaded movable valve member movable from a normally open position to which it is urged by the spring action, to a closed position by pressure created in the system in which the valve is connected, said valve member being secured to the vehicle platform, a rod member operatively connected to said spring loaded valve member to vary the loading of the spring, an arm member pivotally connected at one end to the vehicle platform and with its other end freely disposed against the bracket plate member of the vehicle axle, a casing secured to said arm member in alignment with said rod member, biasing means in said casing acting against said rod member, said arm member being operable to pivot by relative movement between the vehicle platform and bracket member caused by variations in the vehicle loading to cause said biasing means to move said rod member to vary the loading in said spring member.

2. A valve according to claim 1, wherein means are provided for damping any tendency for the arm member to cause oscillation of the movable valve member by the vehicle travelling over uneven ground.

3. A valve according to claim 1, wherein a dashpot device is associated with the rod member.

4. A valve according to claim 1, wherein the biasing means is a spring member.

5. In a fluid pressure braking system including a vehicle with a platform and a bracket plate member spaced therebelow for connection to an axle, a valve housing with an inlet and outlet for pressure fluid, a spring loaded movable valve controlling the flow of fluid between said inlet and outlet adapted to be urged to a closed position against the spring action by pressure fluid entering the inlet, a rod member extending out of the housing and operatively connected to the spring loaded valve to vary the loading of the spring, said housing being secured to said platform, an arm member pivotally connected at one end to said platform with its other end fully disposed and supported on said bracket plate member, a casing secured to said arm member adjacent an opening in the arm member, a pressure plate in said casing, said rod member engaging said pressure plate and extending through said opening, a compression spring in casing continuously acting against said pressure plate to urge said rod member against said spring loaded valve, said arm member being operable to pivot by relative movement between the platform and bracket member caused by variation in the vehicle loading to cause the loading of the spring loaded valve member to vary.

6. The device in claim 5 wherein said housing is substantially vertical and connected to said platform by a bifurcated bracket, and said arm member is pivotally connected to said bifurcated bracket by a pin at a right angle to the axis of said housing.

7. In a fluid pressure braking system, including a vehicle with a frame and a leaf spring spaced therebelow and connected to the frame by a spring shackle, a valve housing disposed in said space and secured to said frame, said housing having an inlet and outlet and a spring loaded valve therein controlling the flow of fluid between said inlet and outlet, said valve adapted to be urged to a closed position against the spring action by pressure fluid entering the inlet, a rod member extending out of the housing and operatively connected to the spring loaded valve, to vary the loading of the spring, a sleeve extending over the lower end of said housing and enclosing said rod, a cylinder telescoped within the lower end of said sleeve, compression spring means urging said sleeve and cylinder apart, lug means pivotally connecting said cylinder to said leaf spring, and a piston in said cylinder in contact with said rod extending into said sleeve whereby relative movement between said frame and leaf spring causes variations in the spring load of said valve.

8. In a fluid pressure braking system including a vehicle with a chassis, drag arms pivotally connected at one end to the chassis and at the other end to the wheel stub axle, a compression tube flexibly secured at one end to the chassis, a swinging stirrup member pivotally connected to the chassis with the other end of the compression tube passing through the stirrup, a valve housing having an inlet and outlet secured to the chassis and extending fore and aft of the chassis and disposed adjacent said tube, a spring loaded movable valve in the housing controlling the passage of fluid between said inlet and outlet and adapted to be urged to a closed position against the spring action by pressure fluid entering the inlet, a rod member operatively connected to said valve to vary the loading of the spring, said rod member contacting said stirrup member, and biasing means mounted on said compression tube for engaging said stirrup member to vary the loading in said spring loaded valve caused by variations in the loading of said vehicle.

References Cited by the Examiner

UNITED STATES PATENTS

| | | | |
|---|---|---|---|
| 1,720,268 | 7/29 | Farmer | 303—22 |
| 2,361,881 | 10/44 | Sheppard | 137—514.7 |
| 2,395,671 | 2/46 | Kleinhaus et al. | |
| 2,424,913 | 7/47 | Browall | 303—22 X |
| 2,667,894 | 2/54 | Towler | 137—514.7 |
| 2,764,996 | 10/56 | Brown | 137—505.42 X |

FOREIGN PATENTS 831,760   3/60   Great Britain.

EUGENE G. BOTZ, *Primary Examiner.*

ARTHUR L. LA POINT, *Examiner.*